US007816468B2

(12) United States Patent
Lyons

(10) Patent No.: US 7,816,468 B2
(45) Date of Patent: *Oct. 19, 2010

(54) COAGULATION OF FLUOROELASTOMER DISPERSIONS WITH POLYETHYLENE OXIDE

(75) Inventor: Donald F. Lyons, Wilmington, DE (US)

(73) Assignee: DuPont Performance Elastomers LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/212,985

(22) Filed: Sep. 18, 2008

(65) Prior Publication Data

US 2010/0069591 A1   Mar. 18, 2010

(51) Int. Cl.
*C08F 14/22* (2006.01)
*C08F 14/28* (2006.01)
*C08F 214/22* (2006.01)
*C08F 214/28* (2006.01)

(52) U.S. Cl. .............. 526/254; 524/366; 524/378; 524/379; 524/612; 525/185; 525/199; 525/258; 525/385; 526/242; 526/250; 526/253; 526/255; 526/291; 526/294; 528/401; 570/123; 570/126; 570/138

(58) Field of Classification Search ............... 525/258; 526/242, 247, 249, 250, 253, 255, 291, 292.9, 526/294
See application file for complete search history.

(56) References Cited

U.S. PATENT DOCUMENTS

| 3,006,872 | A | * | 10/1961 | Benedict | 524/500 |
| 3,062,755 | A | * | 11/1962 | Hill | 528/413 |
| 3,598,794 | A | | 8/1971 | Nersasian | |
| 3,697,496 | A | * | 10/1972 | Ueno et al. | 526/186 |
| 3,842,025 | A | * | 10/1974 | Schlueter et al. | 523/335 |
| 3,997,705 | A | | 12/1976 | Trautvetter et al. | |
| 4,214,060 | A | | 7/1980 | Apotheker et al. | |
| 4,281,092 | A | | 7/1981 | Breazeale | |
| 5,962,570 | A | * | 10/1999 | Sato et al. | 524/457 |
| 7,294,668 | B2 | | 11/2007 | Zipplies et al. | |
| 2002/0037985 | A1 | * | 3/2002 | Lyons et al. | 526/247 |

FOREIGN PATENT DOCUMENTS

WO   WO2008/097639 A1   8/2008

OTHER PUBLICATIONS

Derwent Abstract of EP 1400547.*
Material Safety Data Sheet of Sentry Polyox WSR Coagulant NF, Dow Chemical Inc., Sep. 3, 2007.*
Dow Excipients website for Sentry Polyox WSR Coagulant NF, Dow Chemical Inc., Feb. 10, 2009.*
Somasundaran, P. "Encyclopedia of Surface and Colloid Science", 2006, pp. 4985.*
Anestis L. Logothetis, Chemistry of Fluorocarbon Elastomers, Prog. Polym. Sci., 1989, 251-296, vol. 14, Pergamon Press plc, Great Britain.

* cited by examiner

*Primary Examiner*—Vasu Jagannathan
*Assistant Examiner*—Richard A Huhn

(57) ABSTRACT

Fluoroelastomer gum or crumb is isolated from fluoroelastomer dispersions by the addition of a water-soluble polymeric coagulating agent to the dispersion. This coagulating agent comprises either a homopolymer of ethylene oxide ($CH_2CH_2O$—) or a copolymer of ethylene oxide. Specific examples of such copolymers include, but are not limited to ethylene oxide-propylene oxide copolymers and ethylene oxide-butylene oxide copolymers. The viscosity average molecular weight (Mv), determined by rheology, of the coagulant polymer must be at least 500,000 and preferably greater than 2,000,000.

4 Claims, No Drawings

COAGULATION OF FLUOROELASTOMER DISPERSIONS WITH POLYETHYLENE OXIDE

FIELD OF THE INVENTION

This invention pertains to a novel process for the coagulation of fluoroelastomers wherein a certain class of water-soluble polymers is employed as the coagulating agent, more particularly wherein the class of water-soluble polymers includes polyethylene oxide homopolymer and copolymers of polyethylene oxide.

BACKGROUND OF THE INVENTION

Elastomeric copolymers of vinylidene fluoride having excellent heat resistance, oil resistance, and chemical resistance have been used widely for sealing materials, containers and hoses.

Production of such fluoroelastomers by emulsion polymerization methods is well known in the art; see for example U.S. Pat. Nos. 4,214,060 and 4,281,092. The result of the polymerization is a dispersion or latex of the polymer. Generally, fluoroelastomers are then separated from the dispersion by addition of a coagulant to form a slurry. The slurry is then washed and dried and then shaped into final form for commercial use.

Coagulants heretofore employed are typically salts of inorganic multivalent cations, A. L. Logothetis, *Prog. Polym. Sci*, 14, 251-296 (1989). These include aluminum salts such as aluminum sulfate, alums such as potassium aluminum sulfate, calcium salts such as calcium chloride and calcium nitrate, and magnesium salts such as magnesium chloride, magnesium sulfate, and magnesium nitrate. While these salts work very well as coagulants, residual amounts of these salts remain in the polymer. The presence of these salts renders these polymers unsuitable for use in contamination-sensitive applications such as seals in semiconductor manufacture. Thus, it would be desirable to find other coagulants effective for use in the emulsion polymerization of fluoroelastomers.

Salts of univalent cations, such as sodium chloride, have been proposed as coagulating agents for the manufacture of fluoroelastomers. Residual amounts of these salts are considered relatively innocuous in some end use applications. However, excessively large amounts of salts of univalent cations are required to fully coagulate the fluoroelastomer. The resulting polymer is difficult to fully dry. In addition, the large amounts of these salts that are needed to coagulate the polymer require large and expensive water treatment facilities.

The use of organic coagulants is another method to avoid polymer contamination. Residual amounts of organic coagulants will not contaminate semiconductor processes and in any case may volatilize out of the polymer during the curing process. U.S. Pat. No. 3,598,794 discloses polyamines as coagulants for fluoroelastomers. Addition of a polyamine to a fluoroelastomer dispersion forms a gel that can be separated from the aqueous phase. Washing of this gel, however, is difficult and residual polyamine that remains in the fluoroelastomer interferes in the curing operation.

U.S. Pat. No. 3,997,705 discloses coagulation of a fluoroelastomer with an organic base or salt that acts as a vulcanization accelerator. However, the use of such a coagulant results in a fluoroelastomer that is subject to premature cure or scorch. In addition, the use of such a coagulant restricts the options for subsequent compounding of the fluoroelastomer, since an accelerator is already present in the polymer as received by the customer.

WO 2008/097639 A1 discloses the use of a water-soluble polymer having at least two quaternary onium centers as coagulating agent for fluoroelastomers.

SUMMARY OF THE INVENTION

Surprisingly, it has been found that certain polyethylene oxide (PEO) homopolymers and copolymers may be used to coagulate fluoroelastomers. One aspect of the present invention provides a coagulation process for the production of fluoroelastomers, said fluoroelastomers having at least 53 weight percent fluorine, comprising:

(A) providing an aqueous dispersion comprising a fluoroelastomer, said fluoroelastomer comprising copolymerized units of at least two copolymerizable monomers wherein a first monomer is present in an amount between 5 and 70 weight percent, based on total weight of said fluoroelastomer, said first monomer selected from the group consisting of vinylidene fluoride and tetrafluoroethylene; and (B) adding to said aqueous dispersion a water-soluble polymer selected from the group consisting of polyethylene oxide homopolymers and polyethylene oxide copolymers, said polymer having a viscosity average molecular weight of at least 500,000 thereby coagulating said fluoroelastomer.

DETAILED DESCRIPTION OF THE INVENTION

The present invention is directed to a coagulation process for producing a fluoroelastomer gum or crumb. By "fluoroelastomer" is meant an amorphous elastomeric fluoropolymer. The fluoropolymer may be partially fluorinated or perfluorinated, so long as it contains at least 53 percent by weight fluorine, preferably at least 64 wt. % fluorine.

Fluoroelastomers that may be employed in the process of this invention contain between 5 to 70 weight percent, based on the weight of the fluoroelastomer, of copolymerized units of a first monomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluorine-containing olefins, fluorine-containing vinyl ethers, hydrocarbon olefins and mixtures thereof.

Fluorine-containing olefins copolymerizable with the first monomer include, but are not limited to, vinylidene fluoride, hexafluoropropylene (HFP), tetrafluoroethylene (TFE), 1,2,3,3,3-pentafluoropropene (1-HPFP), chlorotrifluoroethylene (CTFE) and vinyl fluoride.

Fluorine-containing vinyl ethers copolymerizable with the first monomer include, but are not limited to perfluoro(alkyl vinyl)ethers. Perfluoro(alkyl vinyl)ethers (PAVE) suitable for use as monomers include those of the formula

$$CF_2=CFO(R_f O)_n(R_{f'} O)_m R_{f''} \quad (I)$$

where $R_f$ and $R_{f'}$ are different linear or branched perfluoroalkylene groups of 2-6 carbon atoms, m and n are independently 0-10, and $R_{f''}$ is a perfluoroalkyl group of 1-6 carbon atoms.

A preferred class of perfluoro(alkyl vinyl)ethers includes compositions of the formula

$$CF_2=CFO(CF_2CFXO)_n R_f \quad (II)$$

where X is F or $CF_3$, n is 0-5, and $R_f$ is a perfluoroalkyl group of 1-6 carbon atoms.

A most preferred class of perfluoro(alkyl vinyl)ethers includes those ethers wherein n is 0 or 1 and $R_f$ contains 1-3 carbon atoms. Examples of such perfluorinated ethers include perfluoro(methyl vinyl)ether (PMVE) and perfluoro(propyl vinyl)ether (PPVE). Other useful monomers include compounds of the formula

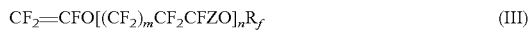 (III)

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl)ether monomers include compounds of the formula

 (IV)

where m and n independently=0-10, p=0-3, and x=1-5. Preferred members of this class include compounds where n=0-1, m=0-1, and x=1.

Other examples of useful perfluoro(alkyl vinyl ethers) include

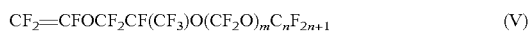 (V)

where n=1-5, m=1-3, and where, preferably, n=1.

If copolymerized units of PAVE are present in fluoroelastomers employed in this invention, the PAVE content generally ranges from 25 to 75 weight percent, based on the total weight of the fluoroelastomer. If perfluoro(methyl vinyl)ether is used, then the fluoroelastomer preferably contains between 30 and 55 wt. % copolymerized PMVE units.

Hydrocarbon olefins useful in the fluoroelastomers employed in this invention include, but are not limited to ethylene (E) and propylene (P). If copolymerized units of a hydrocarbon olefin are present in the fluoroelastomers, hydrocarbon olefin content is generally 4 to 30 weight percent The fluoroelastomers employed in the coagulation process of the present invention may also, optionally, comprise units of one or more cure site monomers. Examples of suitable cure site monomers include: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP); viii) perfluoro(2-phenoxypropyl vinyl) ether; and ix) non-conjugated dienes.

Brominated cure site monomers may contain other halogens, preferably fluorine. Examples of brominated olefin cure site monomers are $CF_2$=$CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromo-perfluoroethyl perfluorovinyl ether and fluorinated compounds of the class $CF_2Br$—$R_f$—O—CF=$CF_2$ ($R_f$ is a perfluoroalkylene group), such as $CF_2BrCF_2O$—CF=$CF_2$, and fluorovinyl ethers of the class ROCF=CFBr or ROCBr=$CF_2$ (where R is a lower alkyl group or fluoroalkyl group) such as $CH_3OCF$=CFBr or $CF_3CH_2OCF$=CFBr.

Suitable iodinated cure site monomers include iodinated olefins of the formula: CHR=CH—Z—$CH_2$CHR—I, wherein R is —H or —$CH_3$; Z is a $C_1$—$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: I($CH_2CF_2CF_2$)$_n$OCF=$CF_2$ and I$CH_2CF_2$O[CF($CF_3$)$CF_2$O]$_n$CF=$CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1(ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodoperfluoroethyl perfluorovinyl ether are also useful cure site monomers.

Useful nitrile-containing cure site monomers include those of the formulas shown below.

 (VI)

where n=2-12, preferably 2-6;

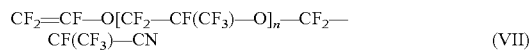 (VII)

where n=0-4, preferably 0-2;

 (VIII)

where x=1-2, and n=1-4; and

 (IX)

where n=2-4. Those of formula (VIII) are preferred. Especially preferred cure site monomers are perfluorinated polyethers having a nitrile group and a trifluorovinyl ether group. A most preferred cure site monomer is

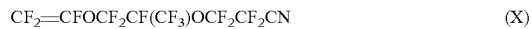 (X)

i.e. perfluoro(8-cyano-5-methyl-3,6-dioxa-1-octene) or 8-CNVE. Nitrile-containing cure site monomers are particularly useful in copolymers also containing tetrafluoroethylene and perfluoro(methyl vinyl ether).

Examples of non-conjugated diene cure site monomers include, but are not limited to 1,4-pentadiene; 1,5-hexadiene; 1,7-octadiene; 3,3,4,4-tetrafluoro-1,5-hexadiene; and others, such as those disclosed in Canadian Patent 2,067,891 and European Patent 0784064A1. A suitable triene is 8-methyl-4-ethylidene-1,7-octadiene.

Of the cure site monomers listed above, preferred compounds, for situations wherein the fluoroelastomer will be cured with peroxide, include 4-bromo-3,3,4,4-tetrafluorobutene-1 (BTFB); 4-iodo-3,3,4,4-tetrafluorobutene-1 (ITFB); allyl iodide; bromotrifluoroethylene and 8-CNVE. When the fluoroelastomer will be cured with a polyol, 2-HPFP or perfluoro(2-phenoxypropyl vinyl)ether is the preferred cure site monomer. When the fluoroelastomer will be cured with a tetraamine, bis(aminophenol) or bis(thioaminophenol), 8-CNVE is the preferred cure site monomer.

Units of cure site monomer, when present in the fluoroelastomers employed in the coagulation process of this invention, are typically present at a level of 0.05-10 wt. % (based on the total weight of fluoroelastomer), preferably 0.05-5 wt. % and most preferably between 0.05 and 3 wt. %.

Specific fluoroelastomers which may be employed in the process of this invention include, but are not limited to those having at least 58 wt. % fluorine and comprising copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl)ether, tetrafluoroethylene and 4-bromo-3,3,4,4-tetrafluorobutene-1; vi) vinylidene fluoride, perfluoro(methyl vinyl)ether, tetrafluoroethylene and 4-iodo-3,3,4,4-tetrafluorobutene-1; vii) vinylidene fluoride, perfluoro(methyl vinyl)ether, tetrafluoroethylene and 1,1,3,3,3-pentafluoropropene; viii) tetrafluoroethylene, perfluoro(methyl vinyl)ether and ethylene; ix) tetrafluoroethylene, perfluoro(methyl vinyl)ether, ethylene and 4-bromo-3,3,4,4-tetrafluorobutene-1; x) tetrafluoroethylene, perfluoro(methyl vinyl)ether, ethylene and 4-iodo-3,3,4,4-tetrafluorobutene-1; xi) tetrafluoroethylene and propylene; xii) tetrafluoroethylene, propylene and 3,3,3-trifluoropropene; xiii) tetrafluoroethylene, propylene, 3,3,3-trifluoropropene and 4-bromo-3,3,4,4-tetrafluorobutene-1; xiv) tetrafluoroethylene, propylene and vinylidene fluoride; xv) tetrafluoroethylene and perfluoro(methyl vinyl)ether; xvi) tetrafluoroethylene, perfluoro(methyl vinyl)ether and perfluoro(8-cyano-5-methyl-3,6-dioxa-1-octene); xvii) tetrafluoroethylene, perfluoro(methyl vinyl)ether and 4-bromo-3,3,4,4-tetrafluorobutene-1; xviii) tetrafluoroethylene, perfluoro(methyl vinyl)ether and 4-iodo-3,3,4,4-tetrafluorobutene-1; and xix) tetrafluoroethylene, perfluoro(methyl vinyl) ether and perfluoro(2-phenoxypropyl vinyl)ether.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005-5 wt. %, preferably 0.05-3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Also included are the cyano-iodine chain transfer agents disclosed European Patent 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other chain transfer agents suitable for use in the process of this invention include those disclosed in U.S. Pat. No. 3,707,529. Examples of such agents include isopropanol, diethylmalonate, ethyl acetate, carbon tetrachloride, acetone and dodecyl mercaptan.

Cure site monomers and chain transfer agents may be added to the reactor neat or as solutions. In addition to being introduced into the reactor near the beginning of polymerization, quantities of chain transfer agent may be added throughout the entire polymerization reaction period, depending upon the desired composition of the fluoroelastomer being produced, the chain transfer agent being employed, and the total reaction time.

Fluoroelastomers that may be employed in the coagulation process of this invention are typically made in an emulsion polymerization process of this invention may be a continuous, semi-batch or batch process.

In a semi-batch emulsion polymerization process, a gaseous monomer mixture of a desired composition (initial monomer charge) is introduced into a reactor which contains an aqueous solution. The aqueous solution may optionally contain a surfactant. The reactor is typically not completely filled with the aqueous solution, so that a vapor space remains. Optionally, the aqueous solution may contain a pH buffer, such as a phosphate or acetate buffer for controlling the pH of the polymerization reaction. Instead of a buffer, a base, such as NaOH may be used to control pH. Generally, pH is controlled to between 1 and 7, depending upon the type of fluoroelastomer being prepared. Alternatively, or additionally, pH buffer or base may be added to the reactor at various times throughout the polymerization reaction, either alone or in combination with other ingredients such as polymerization initiator, liquid cure site monomer, additional surfactant or chain transfer agent. Also optionally, the initial aqueous solution may contain a water-soluble peroxide polymerization initiator. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of a first monomer of either TFE or $VF_2$ and one or more additional monomers which are different from the first monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring. In the initial gaseous monomer charge, the relative amount of each monomer is dictated by reaction kinetics and is set so as to result in a fluoroelastomer having the desired ratio of copolymerized monomer units (i.e. very slow reacting monomers must be present in a higher amount relative to the other monomers than is desired in the composition of the fluoroelastomer to be produced).

The temperature of the semi-batch reaction mixture is maintained in the range of 25° C.-130° C., preferably 50° C.-120° C. Polymerization begins when the initiator either thermally decomposes or reacts with reducing agent and the resulting radicals react with dispersed monomer.

Additional quantities of the gaseous major monomers and cure site monomer (incremental feed) are added at a controlled rate throughout the polymerization in order to maintain a constant reactor pressure at a controlled temperature. The relative ratio of monomers contained in the incremental feed is set to be approximately the same as the desired ratio of copolymerized monomer units in the resulting fluoroelastomer. Thus, the incremental feed contains between 5 to 70 weight percent, based on the total weight of the monomer mixture, of a first monomer of either TFE or $VF_2$ and 95 to 30 weight percent of one or more additional monomers that are different from the first monomer. Chain transfer agent may also, optionally, be introduced into the reactor at any point during this stage of the polymerization. Typically, additional polymerization initiator is also fed to the reactor during this stage of polymerization. The amount of polymer formed is approximately equal to the cumulative amount of incremental monomer feed. One skilled in the art will recognize that the molar ratio of monomers in the incremental feed is not necessarily exactly the same as that of the desired (i.e. selected) copolymerized monomer unit composition in the resulting fluoroelastomer because the composition of the initial charge may not be exactly that required for the selected final fluoroelastomer composition, or because a portion of the monomers in the incremental feed may dissolve into the polymer particles already formed, without reacting. Polymerization times in the range of from 2 to 30 hours are typically employed in this semi-batch polymerization process.

A continuous emulsion polymerization process for manufacture of fluoroelastomers differs from the semi-batch process in the following manner. The reactor is completely filled with aqueous solution so that there is no vapor space. Gaseous monomers and solutions of other ingredients such as water-soluble monomers, chain transfer agents, buffer, bases, polymerization initiator, surfactant, etc., are fed to the reactor in separate streams at a constant rate. Feed rates are controlled so that the average polymer residence time in the reactor is generally between 0.2 to 4 hours. Short residence times are employed for reactive monomers, whereas less reactive monomers such as perfluoro(alkyl vinyl)ethers require more time. The temperature of the continuous process reaction mixture is maintained in the range of 25° C.-130° C., preferably 80° C.-120° C. Also, fluoroelastomer latex particles are more readily formed in the continuous process so that a nucleating agent is not typically required in order to start the polymerization reaction.

The polymerization pressure is controlled in the range of 0.5 to 10 MPa, preferably 1 to 6.2 MPa. In a semi-batch process, the desired polymerization pressure is initially achieved by adjusting the amount of gaseous monomers in the initial charge, and after the reaction is initiated, the pressure is adjusted by controlling the incremental gaseous monomer feed. In a continuous process, pressure is adjusted by a back-pressure regulator in the dispersion effluent line. The polymerization pressure is set in the above range because if it is below 1 MPa, the monomer concentration in the polymerization reaction system is too low to obtain a satisfactory reaction rate. In addition, the molecular weight does not increase sufficiently. If the pressure is above 10 MPa, the cost of the required high pressure equipment is very high.

The amount of fluoroelastomer copolymer formed is approximately equal to the amount of incremental feed charged, and is in the range of 10-30 parts by weight of copolymer per 100 parts by weight of aqueous medium, preferably in the range of 20-25 parts by weight of the copolymer.

The degree of copolymer formation is set in the above range because if it is less than 10 parts by weight, productivity is undesirably low, while if it is above 30 parts by weight, the solids content becomes too high for satisfactory stirring.

Water-soluble inorganic peroxides which may be used to initiate polymerization in this invention include, for example, the ammonium, sodium or potassium salts of hydrogen persulfate. Water-soluble organic peroxides include, for example, disuccinyl peroxide. In a redox-type initiation, a reducing agent such as sodium sulfite, is present in addition to the peroxide. These water-soluble peroxides may be used alone or as a mixture of two or more types. The amount to be used is selected generally in the range of 0.01 to 0.4 parts by weight per 100 parts by weight of polymer, preferably 0.05 to 0.3. During polymerization some of the fluoroelastomer polymer chain ends are capped with fragments generated by the decomposition of these peroxides.

Surfactants, typically anionic surfactants, are optionally employed in these processes. Examples of surfactants include, but are not limited to perfluorooctanoic acid (and its salts), sodium octyl sulfonate, and perfluorohexylethylsulfonic acid (and its salts). However, surfactant is not necessarily required.

Fluoroelastomer gum or crumb is isolated from the fluoroelastomer dispersions by the addition of a water-soluble polymeric coagulating agent to the dispersion. This coagulating agent comprises either a homopolymer of ethylene oxide (CH2CH2O—) or a copolymer of ethylene oxide. Specific examples of such copolymers include, but are not limited to ethylene oxide-propylene oxide copolymers and ethylene oxide-butylene oxide copolymers.

The viscosity average molecular weight (Mv), determined by rheology, of the coagulant polymer must be at least 500,000 and preferably greater than 2,000,000. When the viscosity-average molecular weight of the polyethylene oxide (PEO) homopolymer or copolymer is less than 500,000, either no coagulation occurs or the amount of polyethylene oxide homopolymer or copolymer that is required is uneconomically high. One of ordinary skill in the art will recognize that the minimum viscosity average molecular weight of a PEO homopolymer or copolymer that is useful as a coagulant will vary depending on fluoroelastomer composition, elastomer endgroups, type of surfactant present in the dispersion, amount of surfactant, pH, etc., but is generally 500,000. In some systems it may be 1,000,000 or even 2,000,000 and in others it may be as low as 200,000. Polyethylene oxide is sometimes referred to as polyethylene glycol, especially at low molecular weights.

The polyethylene oxide homopolymer or copolymer is preferably added to the fluoroelastomer dispersion as an aqueous solution. Useful concentrations are 0.001 to 5 wt. %, preferably 0.005 to 1.0 wt. %. Optionally, preservatives or antioxidants may be added to the solutions in order to extend shelf life.

Optionally, the properties of fluoroelastomers coagulated by polyethylene oxide homopolymer or copolymer can be enhanced by subjecting the polymer crumb to an elevated temperature, in the absence of any curatives. The heating process enables the polymer to cure more quickly after compounding with typical polyhydroxy or polyamine curatives known in the art. The polymer may be heated in a quiescent state (i.e. in the absence of shear), to at least 200° C. for one hour or longer. To avoid a cumbersome oven aging process, however, the polymer that has been coagulated with polyethylene oxide is preferably passed through an extruder to conduct the heat treatment. Preferably, the polymer temperature in the extruder reaches at least 150° C., more preferably the polymer temperature reaches at least 250° C. The extruder may be a single screw, twin screw, or Buss® kneader type. Preferably, the extruder is a twin screw extruder or Buss Kneader, and more preferably the extruder includes a vacuum devolatization section.

The fluoroelastomers prepared by the process of this invention are useful in many industrial applications including seals, wire coatings, tubing and laminates.

EXAMPLES

Test Methods

Mooney viscosity, ML (1+10), was determined according to ASTM D1646 with an L (large) type rotor at 121° C., using a preheating time of one minute and rotor operation time of 10 minutes.

Residual metal content was determined by weighing a polymer sample into platinum crucible. Samples were ashed slowly in a muffle furnace to 525 deg C. The ash was digested in hydrochloric acid, hydrofluoric acid, and deionized water. This solution was analyzed on a Perkin-Elmer 5300 ICP Spectrometer.

The invention is further illustrated by, but is not limited to, the following examples.

Example 1

A $VF_2$/HFP copolymer fluoroelastomer was prepared by a continuous emulsion polymerization process, carried out at 115° C. in a well-stirred 4.0-liter stainless steel liquid full reaction vessel. An aqueous solution, consisting of 4.37 g/hour (g/h) ammonium persulfate initiator, 1.75 g/h sodium hydroxide, 3.75 g/h sodium octyl sulfonate, and 4.50 g/h isopropanol chain transfer agent in deionized water, was fed to the reactor at a rate of 10.0 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 1538 g/h vinylidene fluoride ($VF_2$) and 1150 g/h hexafluoropropylene (HFP) fed through a diaphragm compressor. After 2.0 hours, collection of the effluent dispersion was begun and collection continued for 5.0 hours. The effluent latex, which had a pH of 4.36 and contained 20.48 wt. % solids, was separated from residual monomers in a degassing vessel at atmospheric pressure.

A coagulant solution was prepared by dissolving 2 grams of UCARFLOC 309, Mv=8,000,000 (Dow Chemical Co.) in 1998 grams deionized water. The latex was coagulated by feeding the coagulant solution at a 30 mL/min rate at a dosage of 45 mL coagulant solution per liter of latex. The resulting polymer crumb was washed twice, and dried at 70° C. for 48 hours. The product, comprised of 60.7 wt. % $VF_2$ units and 39.3 wt. % HFP units, was an amorphous elastomer having a glass transition temperature of −19.1° C., as determined by differential scanning calorimetry (heating mode, 10° C./minute, inflection point of transition). Inherent viscosity of the elastomer was 0.60 dL/g, measured at 30° C. in methyl ethyl ketone, and Mooney viscosity, ML(1+10) at 121° C., was 27.1.

Example 2

A $VF_2$/HFP copolymer fluoroelastomer was prepared by a continuous emulsion polymerization process, carried out at 115° C. in a well-stirred 4.0-liter stainless steel liquid full reaction vessel. An aqueous solution, consisting of 4.37 g/hour (g/h) ammonium persulfate initiator, 1.75 g/h sodium hydroxide, 3.75 g/h sodium octyl sulfonate, and 3.00 g/h isopropanol chain transfer agent in deionized water, was fed to the reactor at a rate of 10.0 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 1538 g/h vinylidene fluoride ($VF_2$) and 1150 g/h hexafluoropropylene (HFP) fed through a diaphragm compressor. After 2.0 hours, collection of the effluent dispersion was begun and collection continued for 5.0 hours. The effluent latex, which had a pH of 5.15 and contained 20.11 wt. % solids, was separated from residual monomers in a degassing vessel at atmospheric pressure.

A coagulant solution was prepared by dissolving 2 grams of poly(ethylene oxide), Mv=5,000,000 (Aldrich Chemical Co.), in 1998 grams deionized water. The latex was coagulated by feeding the coagulant solution at a 30 mL/min rate at a dosage of 45 mL coagulant solution per liter of latex. The resulting polymer crumb was washed twice, and dried at 70° C. for 48 hours. The product, comprised of 60.4 wt. % $VF_2$ units and 39.6 wt. % HFP units, was an amorphous elastomer having a glass transition temperature of −18.8° C., as determined by differential scanning calorimetry (heating mode, 10° C./minute, inflection point of transition). Inherent viscosity of the elastomer was 0.70 dL/g, measured at 30° C. in methyl ethyl ketone, and Mooney viscosity, ML(1+10) at 121° C., was 42.8.

Metal content of the dried polymer crumb was determined by ICP and reported in parts per million.

| Coagulant | Polyethylene oxide |
| --- | --- |
| Aluminum | 6 |
| Calcium | 9 |
| Chromium | <1 |
| Copper | <1 |
| Iron | <1 |
| Potassium | 3 |
| Magnesium | <1 |
| Sodium | 150 |
| Zinc | <1 |

Example 3

A $VF_2$/HFP/TFE copolymer fluoroelastomer was prepared by a continuous emulsion polymerization process, carried out at 115° C. in a well-stirred 2.0-liter stainless steel liquid full reaction vessel. An aqueous solution, consisting of 2.09 g/hour (g/h) ammonium persulfate initiator, 0.84 g/h sodium hydroxide, 1.80 g/h sodium octyl sulfonate, and 1.01 g/h isopropanol chain transfer agent in deionized water, was fed to the reactor at a rate of 5.0 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 730 g/h vinylidene fluoride ($VF_2$), 384 g/h hexafluoropropylene (HFP), and 130 g/h tetrafluoroethylene (TFE) fed through a diaphragm compressor. After 2.0 hours, collection of effluent dispersion was begun and collection continued for 6 hours. The effluent polymer latex, which had a pH of 4.52 and contained 20.12 wt. % solids, was separated from residual monomers in a degassing vessel at atmospheric pressure.

A coagulation process of the invention was utilized to isolate the fluoroelastomer. A coagulum was formed by adding to 38 liters of polymer latex 2000 grams of a 0.1 wt. % polyethylene oxide (Mv=5,000,000) (Aldrich Chemical Co.) solution. The aqueous phase was removed from the slurry and the resulting wet crumb was dried in an air oven at approximately 50-65° C. to a moisture content of less than 1 wt. %. The product, comprised of 61.5 wt. % $VF_2$ units, 29.3 wt. % HFP units, and 9.21 wt. % TFE units, was an amorphous elastomer having a glass transition temperature of −21.8° C., as determined by differential scanning calorimetry (heating mode, 10° C./minute, inflection point of transition). Inherent viscosity of the elastomer was 0.93 dL/g, measured at 30° C. in methyl ethyl ketone, and Mooney viscosity, ML(1+10) at 121° C., was 66.9.

Example 4

A $VF_2$/PMVE/TFE copolymer fluoroelastomer was prepared by a continuous emulsion polymerization process, carried out at 105° C. in a well-stirred 2.0-liter stainless steel liquid full reaction vessel. An aqueous solution, consisting of 1.98 g/hour (g/h) ammonium persulfate initiator and 0.79 g/h sodium hydroxide, was fed to the reactor at a rate of 4 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 569 g/h vinylidene fluoride ($VF_2$), 393 g/h perfluoro(methyl vinyl ether) (PMVE), and 101 g/h tetrafluoroethylene (TFE), fed through a diaphragm compressor. Fifteen minutes after polymerization commenced, 4-bromo-3,3,4,4-tetrafluoro-1-butene (BTFB) was fed into the reactor at a rate of 10.0 g/h. After a further 1.75 hours, collection of effluent dispersion was begun and collection continued for 5 hours. The effluent polymer latex, which had a pH of 8.64 and contained 20.7 wt. % solids, was separated from residual monomers in a degassing vessel at atmospheric pressure.

A coagulation process of the invention was utilized to isolate the fluoroelastomer. A coagulum was formed by adding to the polymer latex a 0.1 wt. % polyethylene oxide solution that had been prepared from polyethylene oxide with Mv=5,000,000 (Aldrich Chemical Co.) at the ratio of 45 grams PEO solution to 1 liter latex. The aqueous phase was removed from the slurry and the resulting wet crumb was dried in an air oven at approximately 50°-65° C. to a moisture content of less than 1 wt. %. The product, comprised of 55.1 wt. % $VF_2$ units, 35.2 wt. % PMVE units, 8.7 wt. % TFE units, and 1.0 wt. % BTFB units, was an amorphous elastomer having a glass transition temperature of −31.3° C., as determined by differential scanning calorimetry (heating mode, 10° C./minute, inflection point of transition). Inherent viscosity of the elastomer was 1.20 dL/g, measured at 30° C. in methyl ethyl ketone, and Mooney viscosity, ML(1+10) at 121° C., was 93.3.

Example 5

A VF2/HFP copolymer was prepared by a semi-batch process carried out at 80° C. in a well-stirred 33.3 liter stainless steel reaction vessel. The vessel was charged with 24 kg of deionized water and pressurized to 0.66 MPa with a mixture of 38 wt. % VF2 and 62 wt. % HFP. 350 milliliters of a 10.0 wt. % solution of ammonium persulfate was fed to the reactor. As polymerization commenced, the reactor pressure declined. Reactor pressure was maintained at 0.66 MPa by feeding a mixture of 60 wt. % VF2 and 40 wt. % HFP. After 6000 grams of this second mixture had been fed to the reactor, the reactor was depressurized and cooled. A latex was obtained with a pH of 2.8 and 19.22 wt. % polymer solids.

A coagulation process of the invention was utilized to isolate the fluoroelastomer. A coagulum was formed by adding to 1 kilogram of this polymer latex a 0.1 wt. % polyethylene oxide solution that had been prepared from polyethylene oxide with Mv=600,000 (Aldrich Chemical Co.) at the ratio of 2000 grams PEO solution to 1 kilogram latex. The aqueous phase was removed from the slurry and the resulting wet crumb was dried in an air oven at approximately 50°-65° C. to a moisture content of less than 1 wt. %. The product, comprised of 60.5 wt. % $VF_2$ units and 39.5 wt. % HFP units, was an amorphous elastomer having a glass transition temperature of −18.5° C., as determined by differential scanning calorimetry (heating mode, 10° C./minute, inflection point of transition). Inherent viscosity of the elastomer was 0.94 dL/g, measured at 30° C. in methyl ethyl ketone, and Mooney viscosity, ML(1+10) at 121° C., was 51.9.

A second coagulum was formed by adding to 1 kilogram of the above polymer latex a 0.1 wt. % polyethylene oxide solution that had been prepared from polyethylene oxide with Mv=1,000,000 (Aldrich Chemical Co.) at the ratio of 694 grams PEO solution to 1 kilogram latex. The aqueous phase was removed from the slurry and the resulting wet crumb was dried in an air oven at approximately 50°-65° C. to a moisture content of less than 1 wt. %.

Example 6

A TFE/PMVE copolymer was prepared by a semi-batch process carried out at 80° C. in a well-stirred 33.3 liter stainless steel reaction vessel. The vessel was charged with 24 kg of deionized water and pressurized to 1.48 MPa with a mixture of 28 wt. % TFE and 72 wt. % PMVE. 300 milliliters of a 10.0 wt. % solution of ammonium persulfate was fed to the reactor. As polymerization commenced, the reactor pressure declined. Reactor pressure was maintained at 1.48 MPa by feeding a mixture of 52 wt. % TFE and 48 wt. % PMVE. After 6000 grams of this second mixture had been fed to the reactor, the reactor was depressurized and cooled. A latex was obtained with a pH of 3.6 and 19.79 wt. % polymer solids.

A coagulation process of the invention was utilized to isolate the fluoroelastomer. A coagulum was formed by adding to 1 kilogram of this polymer latex a 0.1 wt. % polyethylene oxide solution that had been prepared from polyethylene oxide with Mv=600,000 (Aldrich Chemical Co.) at the ratio of 627 grams PEO solution to 1 kilogram latex. The aqueous phase was removed from the slurry and the resulting wet crumb was dried in an air oven at approximately 50°-65° C. to a moisture content of less than 1 wt. %.

A second coagulum was formed by adding to 1 kilogram of this polymer latex a 0.1 wt. % polyethylene oxide solution that had been prepared from polyethylene oxide with MV=5,000,000 (Aldrich Chemical Co.) at the ratio of 53 grams PEO solution to 1 kilogram latex. The aqueous phase was removed from the slurry and the resulting wet crumb was dried in an air oven at approximately 50°-65° C. to a moisture content of less than 1 wt. %.

The product, comprised of 53.5 wt. % TFE units and 46.5 wt. % PMVE units, was an amorphous elastomer having a glass transition temperature of −1.1° C., as determined by differential scanning calorimetry (heating mode, 10° C./minute, inflection point of transition). The Mooney viscosity, ML(1+10) at 150° C., was 83.7.

Example 7

A VF2/HFP copolymer was prepared by a semi-batch process carried out at 80° C. in a well-stirred 33.3 liter stainless steel reaction vessel. The vessel was charged with a solution of 40.0 grams Zonyl™ 1033D (E. I. DuPont de Nemours Co.), 1.3 grams sodium hydroxide, and 23,958.7 grams deionized water and pressurized to 1.14 MPa with a mixture of 38 wt. % VF2 and 62 wt. % HFP. 30 milliliters of a 5.0 wt. % solution of ammonium persulfate was fed to the reactor. As polymerization commenced, the reactor pressure declined. Reactor pressure was maintained at 1.14 MPa by feeding a mixture of 60 wt. % VF2 and 40 wt. % HFP. After 6000 grams of this second mixture had been fed to the reactor, the reactor was depressurized and cooled. A latex was obtained with a pH of 3.2 and 18.74 wt. % polymer solids.

A coagulation process of the invention was utilized to isolate the fluoroelastomer. A coagulum was formed by adding to 1 kilogram of this polymer latex a 0.1 wt. % polyethylene oxide solution that had been prepared from polyethylene oxide with Mv=2,000,000 (Aldrich Chemical Co.) at the ratio of 163 grams PEO solution to 1 kilogram latex. The aqueous phase was removed from the slurry and the resulting wet crumb was dried in an air oven at approximately 50°-65° C. to a moisture content of less than 1 wt. %.

Example 8

A TFE/Propylene copolymer was prepared by a semi-batch process carried out at 80° C. in a well-stirred 33.3 liter stainless steel reaction vessel. The vessel was charged with a solution of 400.0 grams Zonyl 1033D (E. I. DuPont de Nemours Co.), 68.0 grams diammonium hydrogen phosphate, and 23,532 grams deionized water and pressurized to 1.83 MPa with a mixture of 97 wt. % TFE and 3 wt. % propylene. 100 milliliters of a 10.0 wt. % solution of ammonium persulfate was fed to the reactor. As polymerization commenced, the reactor pressure declined. Reactor pressure was maintained at 1.83 MPa by feeding a mixture of 78 wt. % TFE and 22 wt. % propylene. After 8000 grams of this second mixture had been fed to the reactor, the reactor was depressurized and cooled. A latex was obtained with a pH of 3.3 and 25.13 wt. % polymer solids.

A coagulation process of the invention was utilized to isolate the fluoroelastomer. A coagulum was formed by adding to 1 kilogram of this polymer latex a 0.1 wt. % polyethylene oxide solution that had been prepared from polyethylene oxide with Mv=5,000,000 (Aldrich Chemical Co.) at the ratio of 170 grams PEO solution to 1 kilogram latex. The aqueous phase was removed from the slurry and the resulting wet crumb was dried in an air oven at approximately 50°-65° C. to a moisture content of less than 1 wt. %.

Comparative Example 1

A $VF_2$/HFP copolymer fluoroelastomer was prepared by a continuous emulsion polymerization process, carried out at 115° C. in a well-stirred 4.0-liter stainless steel liquid full reaction vessel. An aqueous solution, consisting of 4.37 g/hour (g/h) ammonium persulfate initiator, 1.75 g/h sodium hydroxide, 3.75 g/h sodium octyl sulfonate, and 3.00 g/h isopropanol chain transfer agent in deionized water, was fed to the reactor at a rate of 10.0 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 1538 g/h vinylidene fluoride ($VF_2$) and 1150 g/h hexafluoropropylene (HFP) fed through a diaphragm compressor. After 2.0 hours, collection of the effluent dispersion was begun and collection continued for 5.0 hours. The effluent dispersion, which had a pH of 4.44 and contained 19.91 wt. % solids, was separated from residual monomers in a degassing vessel at atmospheric pressure.

From the collected dispersion, three 10.0 kg portions were weighed out. One portion was coagulated with 600 grams of a 5 wt. % solution of calcium nitrate tetrahydrate. The second portion was coagulated with 407 grams of a 3 wt. % solution of potassium aluminum sulfate. The third portion was coagulated with 188 grams of a 10 wt. % solution of aluminum sulfate tetradecahydrate. All three polymer crumb samples were washed twice with 10 kg deionized water, and dried at 70° C. for 48 hours.

Metal content of the dried polymer crumb was determined by ICP and reported in parts per million.

| Coagulant | Calcium nitrate tetrahydrate | Potassium aluminum sulfate | Aluminum sulfate tetradecahydrate |
|---|---|---|---|
| Aluminum | 2 | 41 | 55 |
| Calcium | 21 | 2 | <1 |
| Chromium | <1 | <1 | <1 |
| Copper | <1 | <1 | <1 |
| Iron | <1 | <1 | <1 |
| Potassium | 1 | 27 | 2 |
| Magnesium | <1 | <1 | <1 |
| Sodium | 49 | 49 | 47 |
| Zinc | <1 | <1 | <1 |

What is claimed is:

1. A coagulation process for the production of fluoroelastomers, said fluoroelastomers having at least 53 weight percent fluorine, comprising:

(A) providing an aqueous dispersion comprising a fluoroelastomer, said fluoroelastomer comprising copolymerized units of vinylidene fluoride and hexafluoropropylene; and (B) adding to said aqueous dispersion a water-soluble polymer selected from the group consisting of polyethylene oxide homopolymers and copolymers of polyethylene oxide, said water-soluble polymer having a viscosity average molecular weight of at least 500,000 thereby coagulating said fluoroelastomer.

2. A coagulation process according to claim 1 wherein said water-soluble polymer has a viscosity average molecular weight of at least 2,000,000.

3. A coagulation process according to claim 1 wherein said water-soluble polymer is selected from the group consisting of an ethylene oxide-propylene oxide copolymer and an ethylene oxide-butylene oxide copolymer.

4. A coagulation process according to claim 1 wherein said water-soluble polymer is in the form of an aqueous solution when added to said fluoroelastomer dispersion, said aqueous solution containing 0.001 to 5 wt. % water-soluble polymer.

* * * * *